Patented May 20, 1952

2,596,969

UNITED STATES PATENT OFFICE 2,596,969

FERMENTATION PROCESS FOR PRODUCING GRISEIN

David Hendlin, Elizabeth, N. J., assignor to Merck & Co., Inc., Rahway, N. J., a corporation of New Jersey No Drawing. Application November 30, 1948, Serial No. 62,782

5 Claims. (Cl. 195—80)

This invention relates to the preparation of antibiotics and more particularly to a new and improved method for the preparation of grisein.

Grisein is an antibacterial substance produced in stationary and submerged cultures of grisein-producing strains of Streptomyces griseus, microorganisms described by Waksman et al. in Proc. Soc. Exptl. Biol. Med., 64, 50–54. Culture filtrates of this organism were found to inhibit the growth of various gram-negative bacteria, notably Escherichia coli as well as certain gram-positive bacteria, such as Bacillus subtilis and Staphylococcus aureus.

The grisein-producing strain of S. griseus is grown on a variety of media, the best activity having been obtained on media containing meat extract or corn steep liquor, preferably the meat extract, these substances providing the necessary growth requirements. For example, a typical or preferred medium for propagation of the microorganism and elaboration of grisein, as employed by Waksman and his co-workers, is an aqueous liquid containing 0.5% peptone, 0.3% meat extract and 0.3% NaCl. The medium is inoculated with spores of the grisein-producing strains of S. griseus, and the cultures are incubated, in a stationary condition, for 6 to 12 days, or in a shaken or submerged condition, for 4 to 6 days. This preparation showed an activity of about 15–30 E. coli units/ml. More active preparations have been obtained, ranging up to 100 E. coli units/ml.

The necessity for providing an aqueous nutrient medium for the grisein-producing strain of S. griseus which contains meat extract is not economically feasible, since meat extract is an expensive human food. While Waksman and his co-workers have indicated the possibility of corn steep liquor as an alternative, and despite the fact that corn steep liquor is commercially available, its use as a medium for the preparation of antibiotics is highly objectionable. This is attributed to the fact that corn steep liquor is a complex organic mixture of nitrogenous substances obtained from different batches and sources, the heterogeneity and complexity of the components of such mixtures introducing undesirable variations in the grisein content of the culture filtrate, and also giving rise to difficulties in the extraction and concentration of the grisein. Thus, while corn steep liquor has been found, in large scale production to be a desirable though limited constituent of media used for the elaboration of grisein therein by grisein-producing strains of S. griseus, it has been found impossible to dispense entirely with meat extract. In view of the costly character of meat extract, many attempts have been made to replace it by less expensive sources of the grisein-producing nutrients other than corn steep liquor, but, prior to the present discovery, these efforts were largely unsuccessful.

An object of this invention is to provide a new and improved culture medium for the preparation of the antibiotic, grisein. Another object of this invention is to provide a relatively inexpensive method for the efficient preparation of high activity grisein. A still further object of this invention is to provide a method for the preparation of high activity grisein in a relatively short period of time.

It has been discovered that grisein can be prepared by a new and improved method which results in markedly enhanced yields by employing a medium containing as a primary nutrient component, whole yeast, preferably brewers yeast, augmented by inorganic salts. Suitable yeasts are such commercial products as Pfeiffer's yeast and Standard Brands yeast 2019. Inorganic salts such as NaCl (0–2%) and iron salts (0–1000 mgm./liter $FeSO_4.7H_2O$ or 0–200 mgm. $Fe^{++}$/liter) may advantageously be used.

The culture medium should contain, preferably, between 5–20/mgm. $Fe^{++}$/liter, additions of iron being necessary when the iron content of the yeast is less than this concentration. The greatest amount of grisein (highest activity of broth titers) is obtained by using 2–4% Pfeiffer's yeast and 2–30% Standard Brands yeast.

Before inoculation with a grisein-producing strain of S. griseus, the medium must be sterilized. Sterilization is satisfactorily effected by heating the medium and maintaining it at a temperature of 120° C. (15 lbs. pressure) for a period of thirty minutes. After sufficient cooling, the medium is inoculated with a spore suspension or a submerged vegetative inoculum of a grisein-producing strain of *S. griseus*. The pH of the medium just after sterilization is approximately 6.3, and it is usually advisable to adjust the pH to neutrality with an alkali metal hydroxide.

The grisein is recovered or separated from the culture broth by treating with activated charcoal followed by elution with an aqueous solution of pyridine or α-picoline. A solid grisein concentrate is obtained by concentrating the eluate to dryness at reduced pressure.

Maximum grisein production, i. e. broth activities as high as 5000 units/ml., is obtained after an incubation period of 3–4 days in a temperature range of 20–30° C.

A unit of activity is that amount of material which will inhibit the growth of a standard strain of *Escherichia coli* in 1 ml. of a suitable culture medium. (The units are defined in the aforementioned Waksman publication.)

To insure an adequate solution of air throughout the medium, suitable devices for aeration or aeration and agitation are employed.

The following examples illustrate the methods of carrying out the present invention, but it is to be understood that these examples are given by way of illustration and not of limitation.

Example 1

A medium having the following composition was prepared:

3% Standard Brands dried brewers yeast 2019
50 mgs./liter $FeSO_4.7H_2O$
0.5% NaCl—(5 g./liter)
1000 ml. $H_2O$ The percentages in this and succeeding examples are expressed as grams per 100 milliliters of medium.

This medium was divided into 40 ml. portions which were poured into 250 ml. Erlenmeyer flasks. The pH of the medium was adjusted to pH 6.8–7.0 with sodium hydroxide, and the medium was sterilized by maintaining it at a temperature of 120° C. for thirty minutes at 15 lbs. pressure. The culture flasks were then inoculated with a submerged vegetative inoculum of a grisein-producing strain of *S. griseus*, and incubated at a temperature of 28° C. under continuous agitation (220 R. P. M.) on a shaking machine. After four days, the broth showed an activity of 5450 units/ml.

Example 2

Using the procedure as outlined in Example 1, a series of experiments were conducted on the various types of yeast media to determine the effect, if any, on the broth potencies caused by the addition of $Fe^{++}$ and sodium chloride. Typical grisein-producing strains of *S. griseus* were used. The grisein activity is defined in terms of units/ml.

| (a) Using Standard Brands Yeast | 3% Standard Brands Yeast-dry[1] | 10% Standard Brands Yeast-pressed[2] |
|---|---|---|
| 50 mgm./liter $FeSO_4$+0.5% NaCl | 4,650 | 5,110 |
| 0.5% NaCl | 3,200 | 3,700 |
| 50 mgm./liter $FeSO_4$ | 3,500 | 3,000 |
| 0 mgm./liter $FeSO_4$—0.0% NaCl | 2,150 | 2,600 |

[1] The term "dry yeast" as used refers to yeast that is in a powdered form and is absolutely dry.
[2] The term "pressed yeast" as used refers to yeast that has been removed from the fermentation liquor and then pressed to remove liquid therefrom. The resultant yeast contains approximately 75% water.

| (b) Using Pfeiffer's Yeast | Pfeiffer's Yeast—3% |
|---|---|
| 50 mgm./liter $FeSO_4$+0.5% NaCl | 1,030 |
| 0.5% NaCl | 385 |
| 50 mgm./liter $FeSO_4$ | 380 |
| 0 mgm./liter $FeSO_4$—0.0% NaCl | <250 |

Example 3

The effectiveness in various concentrations of the two types of Standard Brands yeast media, i. e. dry and pressed were compared. Grisein activity is expressed in units/ml. Using the procedure as outlined in Example 1, the following results were obtained:

| Yeast | Percent | Grisein Activity |
|---|---|---|
| Dry | 1 | 240 |
|  | 2 | 4,900 |
|  | 3 | 5,450 |
|  | 4 | 3,650 |
|  | 5 | 585 |
| Pressed | 1 | 335 |
|  | 2 | 780 |
|  | 3 | 1,930 |
|  | 5 | 2,370 |
|  | 6 | 3,350 |
|  | 8 | 4,000 |
|  | 10 | 4,800 |
|  | 12 | 4,300 |
|  | 15 | 3,700 |
|  | 20 | 1,700 |
|  | 30 | 780 |

Various changes and modifications may be made in carrying out the present invention without departing from the spirit and scope thereof. Insofar as these changes and modifications are within the scope of the appended claims, they are to be considered as part of this invention.

I claim:

1. The process for producing fermentation broths containing grisein in enhanced concentrations which comprises fermenting a grisein producing strain of *Streptomyces griseus* under aerobic submerged conditions in an aqueous medium containing brewer's yeast as the sole organic nutrient.

2. The process for producing fermentation broths containing grisein in enhanced concentrations which comprises fermenting a grisein producing strain of *Streptomyces griseus* under aerobic submerged conditions in an aqueous medium containing brewer's yeast as the sole organic nutrient and an iron salt.

3. The process for producing fermentation broths containing grisein in enhanced concentrations which comprises fermenting a grisein producing strain of *Streptomyces griseus* under aerobic submerged conditions in an aqueous medium containing brewer's yeast as the sole organic nutrient and sufficient iron salts to provide a concentration of ferrous ion ranging from about 5 to 20 mg. per liter.

4. The process for producing fermentation broths containing grisein in enhanced concentrations which comprises fermenting a grisein producing strain of *Streptomyces griseus* under aerobic submerged conditions in an aqueous medium containing brewer's yeast as the sole organic nutrient, sodium chloride and an iron salt.

5. The process for producing fermentation broths containing grisein in enhanced concentrations which comprises fermenting a grisein producing strain of *Streptomyces griseus* under aerobic submerged conditions in an aqueous medium containing brewer's yeast as the sole organic nutrient, sodium chloride, and sufficient iron salts to provide a concentration of ferrous ion ranging from about 5 to 20 mg. per liter.

DAVID HENDLIN.

REFERENCES CITED

The following references are of record in the file of this patent:

UNITED STATES PATENTS

| Number | Name | Date |
|---|---|---|
| 2,505,053 | Kuehl | Apr. 25, 1950 |

OTHER REFERENCES

Reynolds et al., Grisein, a New Antibiotic Product by a Strain of *Streptomyces griseus*, Proc. Soc. Exptl. Biol. Med. 64, 1–47.

Le Page et al., Jour. Biol. Chem., vol. 162, #1, January 1946.